(12) United States Patent
Gerdisch et al.

(10) Patent No.: US 7,307,945 B2
(45) Date of Patent: Dec. 11, 2007

(54) METHODS FOR PROVIDING A RELIABLE SERVER ARCHITECTURE USING A MULTICAST TOPOLOGY IN A COMMUNICATIONS NETWORK

(75) Inventors: Mitchell R Gerdisch, Naperville, IL (US); Harvey Rubin, Morris Township, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1051 days.

(21) Appl. No.: 10/306,511

(22) Filed: Nov. 27, 2002

(65) Prior Publication Data
US 2004/0100970 A1    May 27, 2004

(51) Int. Cl.
*H04L 12/28* (2006.01)
*H04J 3/26* (2006.01)

(52) U.S. Cl. ..................................... 370/217
(58) Field of Classification Search ........ 370/261, 370/216–220, 395.51, 395.53, 432; 709/203
See application file for complete search history.

(56) References Cited

U.S. PATENT DOCUMENTS

| | | | | |
|---|---|---|---|---|
| 6,389,030 B1 * | 5/2002 | Coden | ...................... | 370/404 |
| 6,414,966 B1 * | 7/2002 | Kulkarni et al. | ............ | 370/465 |
| 6,603,757 B1 * | 8/2003 | Locascio | ..................... | 370/352 |
| 6,963,575 B1 * | 11/2005 | Sistanizadeh et al. | ....... | 370/404 |
| 6,973,024 B1 * | 12/2005 | Joseph et al. | ............... | 370/217 |
| 2003/0028632 A1 * | 2/2003 | Davis | ........................ | 709/224 |

\* cited by examiner

*Primary Examiner*—Chau Nguyen
*Assistant Examiner*—Marcus R Smith
(74) *Attorney, Agent, or Firm*—Steven R. Santema

(57) ABSTRACT

Multi cast techniques are employed to provide host computer elements access to multiple redundant servers of a communication network in such a way that the hosts need not know which of the servers is active. In one embodiment, the servers provide a gateway function between an Ethernet LAN and an external network. The Ethernet LAN comprises one or more hosts connected to one or more switches, the switches connected to corresponding servers defining an active/standby pair. The servers are connected to an external network by corresponding active/standby links. The hosts send messages directed to a multicast address to at least one of the switches. The switches forward the messages on ports according to a multicast routing topology having been determined by performing IGMP "snooping" of messages issued from the servers. Both the active and standby servers receive the messages; and the active server sends the messages to the external network. In case the active server fails or is removed from service, the standby server is promoted to active server and assumes the role of the formerly active server without necessitating any communication to the hosts to inform them of the change in status of the active server.

14 Claims, 3 Drawing Sheets

METHODS FOR PROVIDING A RELIABLE SERVER ARCHITECTURE USING A MULTICAST TOPOLOGY IN A COMMUNICATIONS NETWORK

FIELD OF THE INVENTION

This invention relates generally to communication networks and, more particularly, to communication networks having two or more servers.

BACKGROUND OF THE INVENTION

Communication networks, such as Local Area Networks (LANs), are known to interconnect communication devices spanning a limited geographical area (such as within a building or campus) by a physical medium, such as coax, twisted pair, fiber optic cable or wireless medium. Generally, LANs include multiple endpoints (or "hosts"), such as computers or computer elements sharing a common communication protocol such as, for example, Internet Protocol (IP). Oftentimes, LANs include gateway/server nodes (hereinafter "servers") for performing certain algorithmic functions requested by the hosts. For example, servers may perform a "gateway" function linking the LAN to external networks that use different communication protocol(s), such that messages may be communicated between the hosts and the external networks. The hosts and servers may be linked by a switching element comprising, for example, one or more Ethernet switches, that reside within the communication network.

To enhance reliability of the system, it is known to employ redundant servers to perform algorithmic functions including but not limited to gateway functions. For example, in a network including two servers, one server may be designated as active and the other standby such that, in the event of a failure of the active server, the server functionality transitions from the failed server to the standby server. In such manner the standby server becomes the new active server and, as quickly as possible, the server functionality transitions to the new active server. For example, in the case where the servers perform gateway functions, and wherein the active server fails, packets sent to/from the hosts may be redirected across new transmission paths (i.e., via the newly active server rather than through the failed server).

One approach to establish the new transmission paths is to inform the hosts whenever the active server fails, thereby instructing the hosts to send packets to the backup server and stop sending packets to the failed active server. More generally, the hosts may be informed whenever the active server fails so that they know which server is available to perform algorithmic functions. However, this approach is inefficient in terms of message traffic and can cause intolerable delays due to the time required for the network to detect failure of the active server, identify the backup server as the newly active server and inform the hosts accordingly. Another approach is to have the hosts affirmatively send packets to both the active and standby servers. However, this approach is even less efficient and may cause adverse effects (e.g., quality, bandwidth) on the network due to superfluous message traffic.

It would be desirable for purposes of reliability and efficiency to provide a server architecture employing redundant servers, within a communication network including one or more hosts connected to the servers, in a manner that does not require hosts to be notified when a server fails or which server is active, and which reduces or eliminates superfluous message traffic. The present invention is directed to addressing these needs.

SUMMARY OF THE INVENTION

The present invention provides a reliable server architecture using a multicast topology established between host computer elements and servers of a communication network, in a manner that does not require the hosts to be aware of which of multiple redundant servers is active and which reduces message traffic relative to the prior art. In the preferred embodiment, the servers provide a gateway function and the server architecture is used to provide fault-tolerant transmission paths between the hosts and an external network. More generally, the servers perform an algorithmic service to requesting programs on host computers and the server architecture is used to provide greater reliability of the algorithmic service.

In one embodiment, there is provided a method for use in a communication network including a host interconnected via a switching element to an active and standby server. A multicast routing topology identifies which ports of the switching element are to be used for forwarding messages directed to a particular multicast address. Upon sending a message from the host directed to the multicast address, the host need not know which one of the servers is active. The switching element forwards the message to both the active and standby servers according to the multicast routing topology, and the active server processes the message. If there is a change in state of the active and standby servers (i.e., the active server fails or is removed from service and the standby server becomes the new active server), the new active server processes the message without the need to inform the host of the changing state.

In another embodiment, there is provided a method for use in a communication network including a switching element connected to N+K servers, N defining a number of active servers and K defining a number of standby servers. Upon receiving a message directed to a multicast address, the switching element forwards the message according to a multicast routing topology, causing the message to be received by the N+K servers and processed by the N active servers. The multicast routing topology may be defined by IGMP snooping of messages issued by the N+K servers and/or provisioning of ports independent of IGMP snooping. If there is a change in state of the active and standby servers (i.e., a number of the N active servers become formerly active servers and a number of the K standby servers become new active servers), the new active servers process the message without the need to inform the sender of their change in state.

In yet another embodiment, there is provided a communication network comprising one or more hosts, a switching element, an active and standby server and means for sending a message from a host of the one or more hosts to the active server without the host having knowledge of which one of the active and standby servers is active. The hosts are each connected to the switching element by an active and standby link and the switching element connects the hosts to the active and standby server according to a multicast routing topology. In one embodiment, the network further includes means for changing state of the active and standby servers (i.e., the active server becomes a formerly active server and the standby server becomes a new active server) and means for processing the message by the new active server without informing the host of the changing state.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

Figure 1:
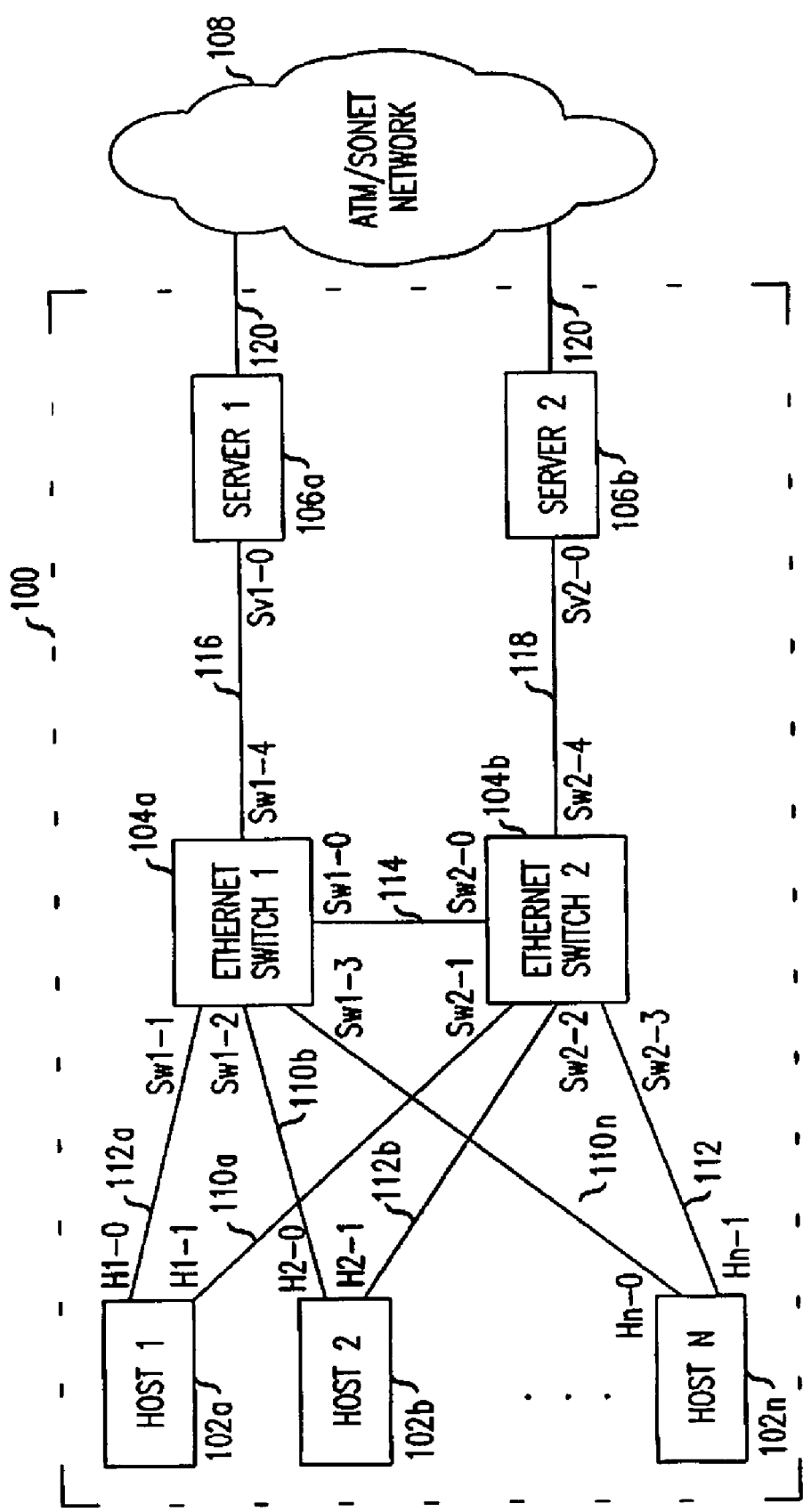
FIG. 1 is a block diagram of an Ethernet LAN connected to an external ATM/SONET network, wherein packets are routed via a reliable server architecture established using a multicast topology according to one embodiment of the present invention.

FIG. 1 shows by way of example and not limitation, an Ethernet LAN 100 interconnecting a plurality of hosts 102, Ethernet switches 104a, 104b and a pair of servers 106a, 106b. For example, the Ethernet LAN 100 may reside within a Radio Network Controller (RNC)) as known in mobile telecommunication systems such as Universal Mobile Telecommunications System (UMTS) or CDMA2000, which RNC is typically connected to an ATM/SONET network. In such case, the hosts 102 comprise traffic processors that perform, among other things, frame selection functions and which send messages to other parts of the system.

The servers 106a,b operate as an active-standby pair (as shown, Server 1 is active, Server 2 is standby) such that if the active server fails or the link supported by the active server fails, the standby server will take over. For convenience, the hosts 102 are further identified as "Host 1" to "Host N," the switches "Ethernet Switch 1" and "Ethernet Switch 2" and the servers "Server 1" and "Server 2." The servers 106 are connected via links 120 to an external network 108 (as shown, an Asynchronous Transfer Mode (ATM)/Synchronous Optical Network (SONET)).

As shown, the hosts 102 are redundantly connected to the switches 104 via respective active links 110 and standby links 112. The active links 110 (solid lines) are links that are presently being used and the standby links 112 (dashed lines) are used in the event of failure of the active link. More particularly, Host 1 is connected by active link 110a to Ethernet Switch 2 and by standby link 112a to Ethernet Switch 1; Host 2 is connected by active link 110b to Ethernet Switch 1 and by standby link 112b to Ethernet Switch 2; and Host N is connected by active link 110n to Ethernet Switch 1 and by standby link 112n to Ethernet Switch 2. The links 110, 112 may comprise without limitation, coax, twisted pair, fiber optic cable or wireless links.

The switches 104a,b are connected to each other via link 114 and to the servers 106 by respective links 116, 118. In one embodiment, the switches 104a,b are both active such that both switches can be switching Ethernet frames at any given time. The links 114, 116, 118 may comprise without limitation, coax, twisted pair, fiber optic cable or wireless links. In one embodiment, the links 114, 116, 118 are all active to allow any host to reach any other host and any switch (and hence, any server), and vice versa. In one embodiment, the link 114 is provisioned such that frames addressed to any multicast address being used in the network are sent over link 114.

In one embodiment, the messages from the hosts comprise IP packets encapsulated within Ethernet frames, wherein the IP packets are addressed to an IP multicast address. In one embodiment, each Ethernet frame includes a single IP multicast packet. The switches 104 perform layer 2 processing/switching of the Ethernet frames and routing of the messages to the servers 106. As will be described in greater detail in relation to FIG. 2, the servers 106a, 106b join the multicast address, indicating their desire to receive packets addressed to the multicast address, by sending Internet Group Management Protocol (IGMP) "Join" messages to their attached switch 104a or 104b.

Figure 2:
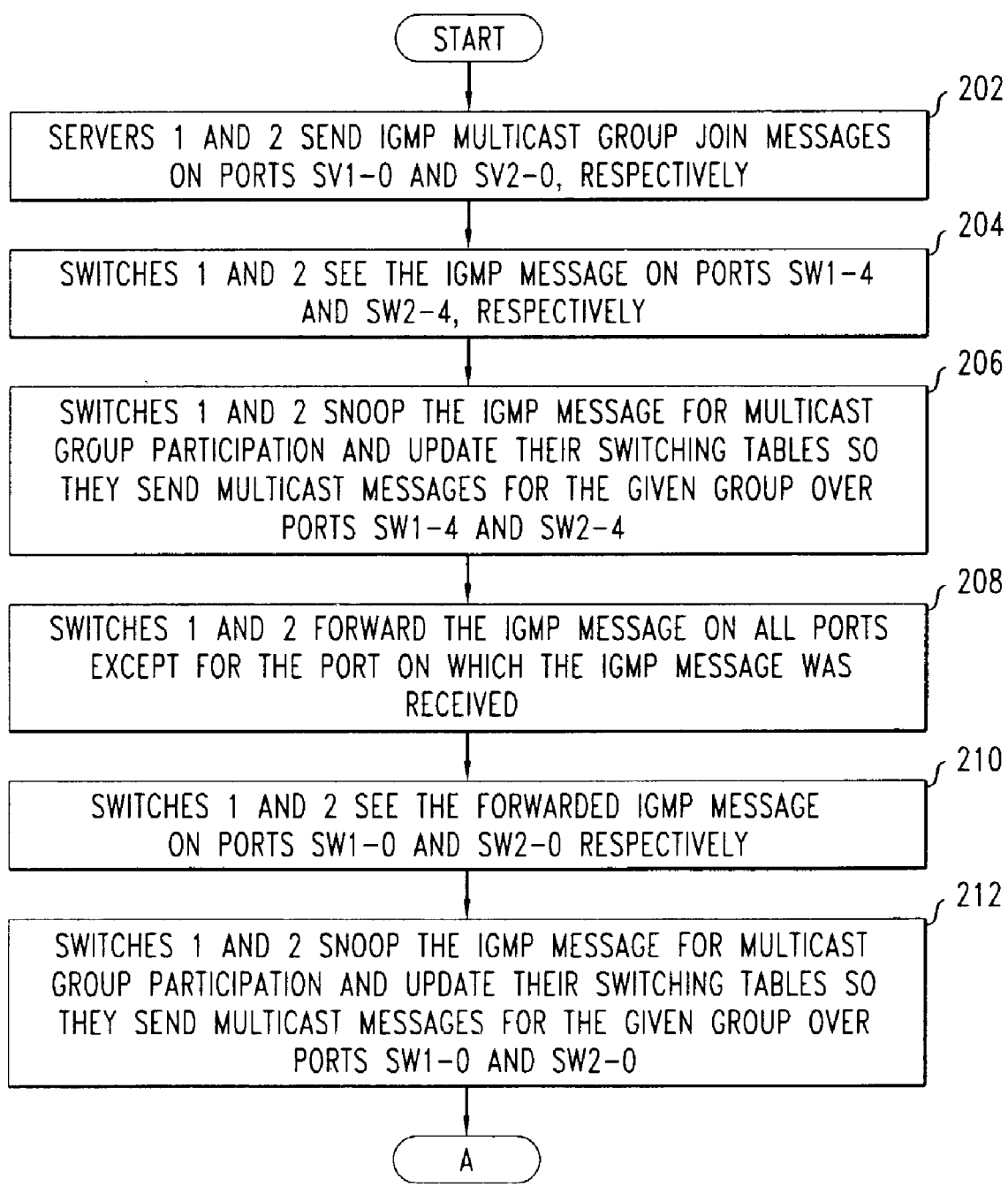
FIG. 2 is a flowchart of a method for setting up a multicast topology for routing packets over an Ethernet LAN according to one embodiment of the present invention.

According to principles of the present invention and as described in greater detail in relation to FIG. 2, the switches 104 perform IGMP "snooping" of the Ethernet frames to detect from which ports IGMP messages have been received and to track which multicast groups correspond to which ports, thereby defining a multicast topology. (The Ethernet switches 104 are Layer 2 devices generally adapted to process Ethernet frames, not the embedded IP packets.) In one embodiment, the multicast topology is further defined by provisioning the connections between the two switches to forward such packets. Thereafter, upon receiving packets from a host directed to a particular multicast address, the switches send the packets to the appropriate servers and each other based on the multicast topology, as will described in greater detail in relation to FIG. 3. Consequently and advantageously, IP multicast messages are not broadcast to all members of the LAN but rather sent only over switch ports on which the switch detected an IGMP message (or on ports provisioned to perform multicast forwarding for specific multicast addresses), thereby avoiding flooding the network with superfluous traffic.

In one embodiment, after having received the IP multicast message(s), the active server 106a converts the messages to ATM/SONET format and delivers the message to the ATM/SONET network over the corresponding active link 120a. Links 120a, 120b comprise an active/standby pair as specified in UMTS or CDMA2000 standards. As will be appreciated, alternative network configurations may use a single link, multiple active links or multiple standby links.

Further, as will be appreciated, the embodiment described in relation to FIG. 1 is exemplary only. The present invention is not limited for use within Ethernet LANs (and hence, the switches need not comprise Ethernet switches) and the servers are not limited for use to perform gateway functions. Generally, the present invention is operable to provide a reliable server architecture in any network environment having one or more hosts interconnected by a switching element to redundant servers. The switching element may comprise one or more switches. Higher degrees of reliability may be obtained by incorporating greater than two servers in the network. Generally, a pool of N+K servers may be used, wherein N servers are active and K servers are standby. Still further alternative configurations may use fewer or greater links between hosts and switch(es), switch(es) and servers or, when multiple switches are used, between switches.

Now turning to FIG. 2, there will be described a method for setting up a multicast topology for routing packets over an Ethernet LAN according to one embodiment of the present invention. For convenience, the method presumes the network configuration of FIG. 1 including Ethernet switches 1 and 2 both active and servers 1 and 2 defining an active/standby pair. The steps of FIG. 2 are implemented, where applicable, by stored software routines within servers 1 and 2 and Ethernet switches 1 and 2.

At step 202, servers 1 and 2 send IGMP Join messages to the respective Ethernet switches 1 and 2 on ports Sv1-0 and Sv2-0, respectively. The Join messages specify a multicast address (hereinafter, multicast address "A"), thereby indicating a desire of the servers to receive messages directed to multicast address A. In one embodiment, step 202 is accomplished upon boot up/initialization of servers 1 and 2 and then periodically afterward as needed or desired to update the switches. Alternatively, step 202 may be accomplished generally any time the servers desire to begin receiving messages directed to a particular multicast address.

At step 204, switches 1 and 2 receive the IGMP messages on ports Sw1-4 and Sw2-4, respectively. At step 206, switches 1 and 2 snoop the IGMP messages for multicast group participation and update their switching tables accordingly. Thus, in the present example, switches 1 and 2 will maintain a switching table indicating that messages directed to multicast group A should be sent over ports Sw1-4 and Sw2-4, respectively. Alternatively, ports Sw1-4 and Sw2-4 could be provisioned for use in forwarding packets directed to multicast group A independent of IGMP snooping.

At step 208, switches 1 and 2 forward the IGMP messages on all ports except for the port on which the IGMP message was received. Thus, in the present example, switch 1 forwards the IGMP message received on port Sw1-4 to switch 2 on port Sw1-0 and switch 2 forwards the IGMP message received on port Sw2-4 to switch 1 on port Sw2-0. Alternatively, via an administrative interface, each Ethernet switch may be provisioned to forward multicast packets with address A over the links to the other switch independent of IGMP snooping.

At step 210, switches 1 and 2 receive the forwarded IGMP messages on ports Sw1-0 and Sw2-0, respectively and at step 212, switches 1 and 2 snoop the IGMP messages for multicast group participation and update their switching tables accordingly. Thus, in the present example, switches 1 and 2 will add an entry to their switching tables indicating that messages directed to multicast group A should also be sent over ports Sw1-0 and Sw2-0. At this point, the switching table is complete with respect to multicast group A. The switching table defines a multicast topology indicating over which ports messages directed to multicast A should be sent from each switch. In the present example, switch 1 will send messages directed to multicast group A over ports Sw1-4 and Sw1-0, whereas switch 2 will send messages directed to multicast group A over ports Sw2-4 and Sw2-0. Alternatively, switches 1 and 2 may be provisioned to forward multicast packets with address A over ports Sw1-4 and Sw1-0, Sw2-4 and Sw2-0 independent of IGMP snooping.

At this point, the switching table is complete with respect to multicast group A. The switching table defines a multicast topology indicating over which ports messages directed to multicast A should be sent from each switch. In the present example, switch 1 will send messages directed to multicast group A over ports Sw1-4 and Sw1-0, whereas switch 2 will send messages directed to multicast group A over ports Sw2-4 and Sw2-0.

Figure 3:
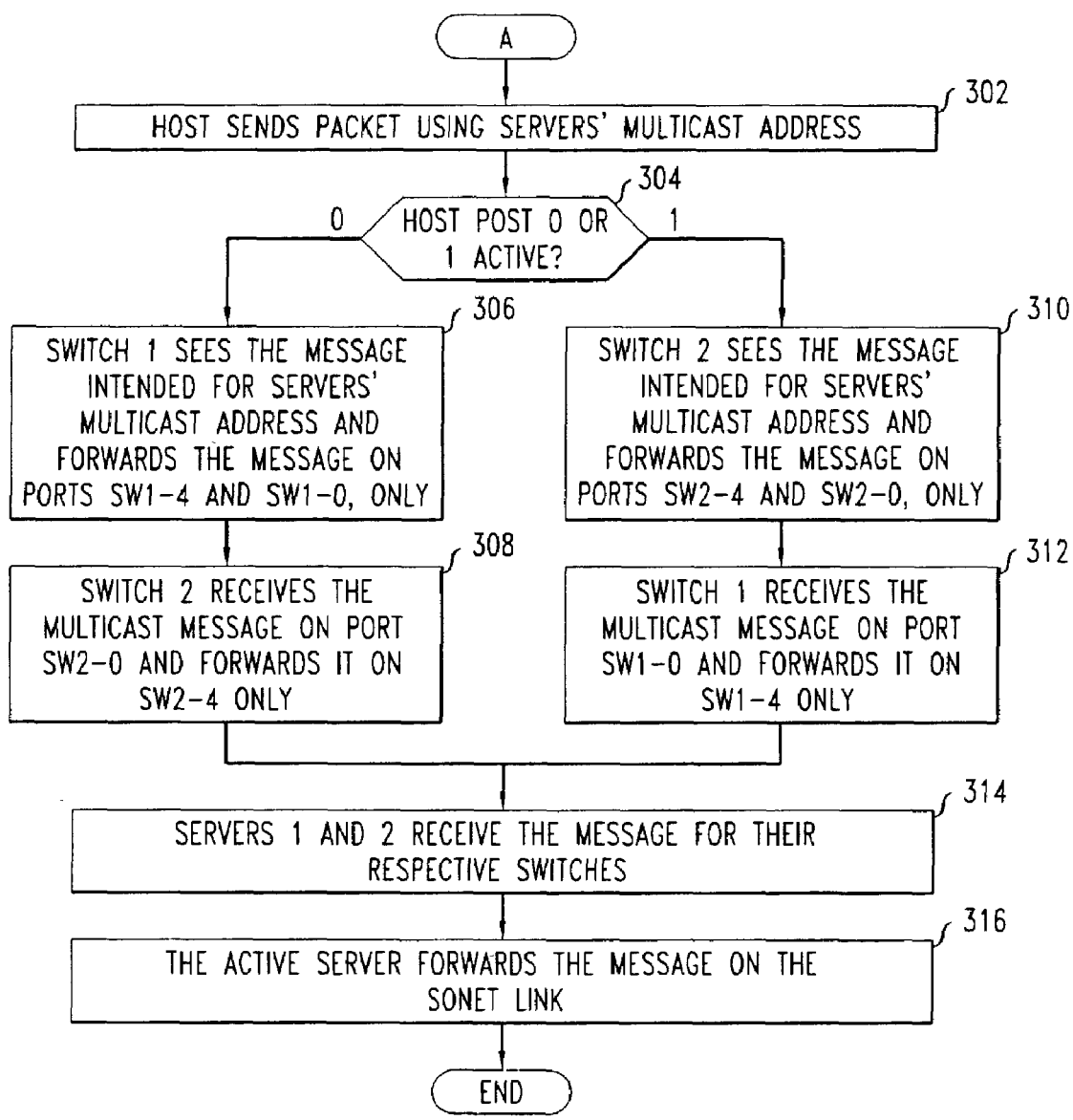
FIG. 3 is a flowchart of a method for sending packets from host to active server via a multicast topology for delivery to an ATM/SONET network according to one embodiment of the present invention.

FIG. 3 shows a method for sending packets from host to active server via a multicast topology for delivery to an ATM/SONET network according to one embodiment of the present invention. The method presumes the network configuration of FIG. 1 with multicast topology defined according to the example of FIG. 2. The steps of FIG. 3 are implemented, where applicable, by stored software routines within the hosts, servers 1 and 2 and Ethernet switches 1 and 2.

At step 302, host(s) send packets to the servers 106 (i.e., for subsequent delivery over the ATM/SONET network 108) by sending the packets addressed to multicast group address "A." Depending on which host port, 0 or 1, is active (determined at block 304), the packets are sent to either switch 1 or switch 2. It is noted, the hosts need not know (and indeed, generally do not know) which of the servers 106a, 106b is active and which is standby. Conversely, it is noted, the servers need not know which port is being used by the host. As will be described, both servers 106a, 106b (having joined multicast group A) receive the packet regardless of which port is being used by the host, but only the active server 106a forwards the packet to the ATM/SONET network, via link 120a.

If port 0 is active, switch 1 receives the message at step 306 and, according to its multicast routing table, forwards the message over ports Sw1-4 and Sw1-0. At step 308, switch 2 receives the message on port Sw2-0 and, according to its multicast routing table, forwards the message over port Sw2-4. In the preferred embodiment, the switches do not forward messages on ports from which they received the messages. Thus, even though switch 2 maintains a routing table associating multicast group A with ports Sw2-4 and Sw2-0, it does not forward the message on port Sw2-0 because that is the port from which it received the message.

If port 1 is active, switch 2 receives the message at step 310 and, according to its multicast routing table, forwards the message over ports Sw2-4 and Sw2-0. At step 312, switch 1 receives the message on port Sw1-0 and, according to its multicast routing table, forwards the message over port Sw1-4. Again, in the preferred embodiment, the switches do not forward messages on ports from which they received the messages. Thus, even though switch 1 maintains a routing table associating multicast group A with ports Sw1-4 and Sw1-0, it does not forward the message on port Sw1-0 because that is the port from which it received the message.

At step 314, servers 1 and 2 receive the messages from their respective switches. Thus, in the present example, server 1 receives messages from switch 1 sent via port Sw1-4, and server 2 receives messages from switch 2 sent via port Sw2-4. At step 316, the active server (e.g., server 1, as shown in FIG. 1) forwards the message on its SONET link (e.g., link 120a).

Thus, one sees that the present invention provides reliable communications over an Ethernet LAN while minimizing superfluous message traffic, by using multicast technology in conjunction with IGMP snooping and/or multicast forwarding provisioning of the Ethernet switches. While multicast is generally used as a manner of broadcasting information to multiple independent clients interconnected by routers of an IP network, it is used in the present invention to provide a fault-tolerant transmission path between hosts and an active/standby server pair of an Ethernet LAN interconnected by layer 2 Ethernet switches.

Hosts send messages over their active Ethernet link using a particular multicast address, the multicast address having been joined by the servers. The Ethernet switch that receives the message (depending on which of the links on the host is currently active) forwards the message over the port to its attached server, the switch having snooped the IGMP message sent by that server. The switch also forwards the message over the port to the other Ethernet switch, the inter-switch connection having also been configured for the given multicast address by IGMP snooping. Consequently, both Ethernet switches receive the message and both switches forward the message to their attached servers without the hosts having sent multiple instances of the message to the switches and/or servers. Both servers receive the message, and hence the active server receives the message without the host necessarily knowing which server is active. Only the active server processes the message.

In the event the active server fails, the hosts need not do anything differently. They continue sending packets to the same multicast address. The standby server is the only element that needs to detect and react to the failure. Once the standby server detects the failure, it takes over as active server. Since it has already been receiving all the traffic that the formerly active server was receiving, the new active server can take over without dropping packets, without informing the hosts of its change in status and without waiting for the hosts to start sending packets to it.

The present invention may be embodied in other specific forms without departing from its spirit or essential characteristics. The described embodiments are to be considered in all respects only as illustrative and not restrictive. For example, the servers can provide any algorithmic service to requesting programs on the host computers and are not limited to providing a gateway function between two networks, as illustrated herein. Also, the number of servers in the multicast group need not be constrained to two in number. Higher degrees of reliability can be achieved if more than two servers are incorporated into the network architecture. The scope of the invention is, therefore, indicated by the appended claims rather than by the foregoing description. All changes that come within the meaning and range of equivalency of the claims are to be embraced within their scope.

What is claimed is:

1. In a communication network including a host interconnected via a switching element to an active and standby server, the switching element comprising a first and second switch and including a plurality of ports, the first switch connected to the active server and the second switch connected to the standby server, a method comprising:
    defining a multicast routing topology associated with a multicast address, the multicast routing topology identifying which ports of the plurality of ports are to be used for forwarding messages directed to the multicast address;
    sending a message from the host to one of the first and second switches directed to the multicast address;
    sending the message from the one of the first and second switches to the other of the first and second switches, from the first switch to the active server and from the second switch to the standby server according to the multicast routing topology; and
    processing the message by the active server.

2. The method of claim 1, wherein the step of sending a message from the host is accomplished without the host having knowledge of which one of the active and standby servers is active.

3. The method of claim 1, further comprising:
    changing state of the active and standby servers, the active server becoming a formerly active server and the standby server becoming a new active server, the step of processing the message comprising processing the message by the new active server without informing the host of the changing state.

4. The method of claim 1, wherein the communication network comprises an Ethernet LAN and the switching element comprises first and second Ethernet switches.

5. The method of claim 4, wherein the active and standby server provide a gateway between the Ethernet LAN and an external network, the step of processing the message comprising sending the message from the active server to the external network.

6. The method of claim 4, wherein the active and standby server provide a gateway between the Ethernet LAN and an external network, the step of processing the message comprising:
    converting the message to a format associated with the external network, yielding a converted message; and
    sending the converted message from the active server to the external network.

7. The method of claim 6, wherein the external network comprises an ATM/SONET network, the step of converting the message comprising converting the message from a format associated with the Ethernet LAN to a format associated with the ATM/SONET network.

8. The method of claim 1, wherein the step of defining a multicast topology comprises:
    receiving, by the switching element, commands issued by the active and standby servers indicating a desire of the servers to receive messages addressed to the multicast address;
    identifying ports on which the commands were received; and
    mapping the multicast address to the ports, thereby forming the multicast routing topology.

9. The method of claim 8 wherein the step of receiving the commands comprises receiving IGMP Join messages.

10. The method of claim 8 wherein the step of defining a multicast topology further comprises provisioning ports on the switching element for forwarding packets directed to the multicast address.

11. The method of claim 10 wherein the step of provisioning ports comprises provisioning one or more ports independent of the commands issued by the active and standby servers.

12. In a communication network including a switching element comprising at least a first and second switch connected to N+K servers, N defining a number of active servers and K defining a number of standby servers, wherein N and K are integers, a method comprising:
    receiving, by the first switch, a message directed to a multicast address;
    forwarding the message according to a multicast routing topology that includes routing the message from the first switch to the second switch, the multicast routing topology defined by at least one of: Internet Group Management Protocol (IGMP) snooping of messages issued by the N+K servers and provisioning of ports independent of IGMP snooping;
    receiving the message by the N+K servers; and
    processing the message by the N active servers.

13. The method of claim 12, wherein the step of receiving a message by the switching element comprises receiving the message from a host having no knowledge of which servers of the N+K servers are active servers.

14. The method of claim 13, further comprising:
    changing state of at least a portion of the N+K servers, a number of the N active servers becoming formerly active servers and a number of the K standby servers becoming new active servers, the step of processing the message comprising processing the message by the new active servers without informing the host of the changing state.

* * * * *